April 1, 1941.  D. F. BABCOCK ET AL  2,236,963
CHEMICAL PROCESS
Filed June 10, 1938  3 Sheets-Sheet 1

Dale F. Babcock
Crawford H. Greenewalt
Hood Worthington INVENTORS

BY

George W. Walker ATTORNEY

Dale F. Babcock
Crawford H. Greenewalt    INVENTORS
Hood Worthington
BY
George W. Walker ATTORNEY Dale F. Babcock
Crawford H. Greenewalt
Hood Worthington
INVENTORS BY George W. Walker ATTORNEY Patented Apr. 1, 1941

2,236,963

UNITED STATES PATENT OFFICE 2,236,963

CHEMICAL PROCESS

Dale F. Babcock, Crawford H. Greenewalt, and Hood Worthington, Wilmington, Del., assignors to E. I. du Pont de Nemours & Company, Wilmington, Del., a corporation of Delaware Application June 10, 1938, Serial No. 212,904

2 Claims. (Cl. 62—175.5)

This invention relates to the recovery of concentrated acetylene gas from admixture with other gases, and more particularly to the recovery of acetylene from mixtures containing ethylene together with hydrogen and with other hydrocarbons boiling above and below acetylene.

Until recently all acetylene was manufactured from calcium carbide but its use for chemical synthesis has created such a demand that attempts have been made to obtain it from other sources. Most of these attempts have been in the field of high temperature cracking of gaseous or liquid hydrocarbons, usually by means of an electric arc. The gas produced by this cracking step consists chiefly of hydrogen, ethylene, and acetylene but contains in addition small quantities of other hydrocarbons boiling above and below acetylene. These hydrocarbons are mostly unsaturated and consist chiefly of ethylene, propylene, butylenes, methyl acetylene, and diacetylene. There are many known ways of partially removing the hydrocarbon impurities in order to concentrate the acetylene but no known process discloses a complete operation for the removal of all of these impurities and at the same time separates highly concentrated acetylene gas.

This invention has as its object the recovery of concentrated acetylene gas from admixture with other gases, especially gases including ethylene. A further object is the production of concentrated acetylene gas by removing same from admixture with other hydrocarbons and hydrogen. A still further object is the recovery of acetylene from gaseous products obtained by cracking oils at temperatures such as are obtainable in the electric arc. A still further object is the separation of acetylene contaminated only by any ethane that may be present from hydrogen and higher boiling hydrocarbons. Other objects will appear hereinafter.

These objects are accomplished by the following invention.

The gas mixture containing acetylene and gases boiling above and below acetylene are treated under such conditions as will cause those components less volatile than acetylene to be separated from acetylene and the components more volatile than acetylene. This may be done by a low temperature rectification of the gaseous mixture or by scrubbing the gaseous mixture with a non-selective solvent. After the removal of those components less volatile than acetylene the resulting gas is rectified under conditions that will cause the separation of acetylene as a liquid fraction and the components more volatile than acetylene as a gas fraction.

The second rectification step in which acetylene is recovered as a liquid fraction may be operated in any one of several ways. This rectification may be operated by condensing a mixture of acetylene and ethylene at one pressure and partially separating the lower boiling gases from same, then rectifying the mixture of acetylene and ethylene at a lower pressure so as to separate pure acetylene as a liquid and ethylene together with any more volatile components remaining therein as a gas. Another method consists in the single step of fractionating the gases so as to separate acetylene as a liquid and the more volatile components as a gas.

Figure 1:
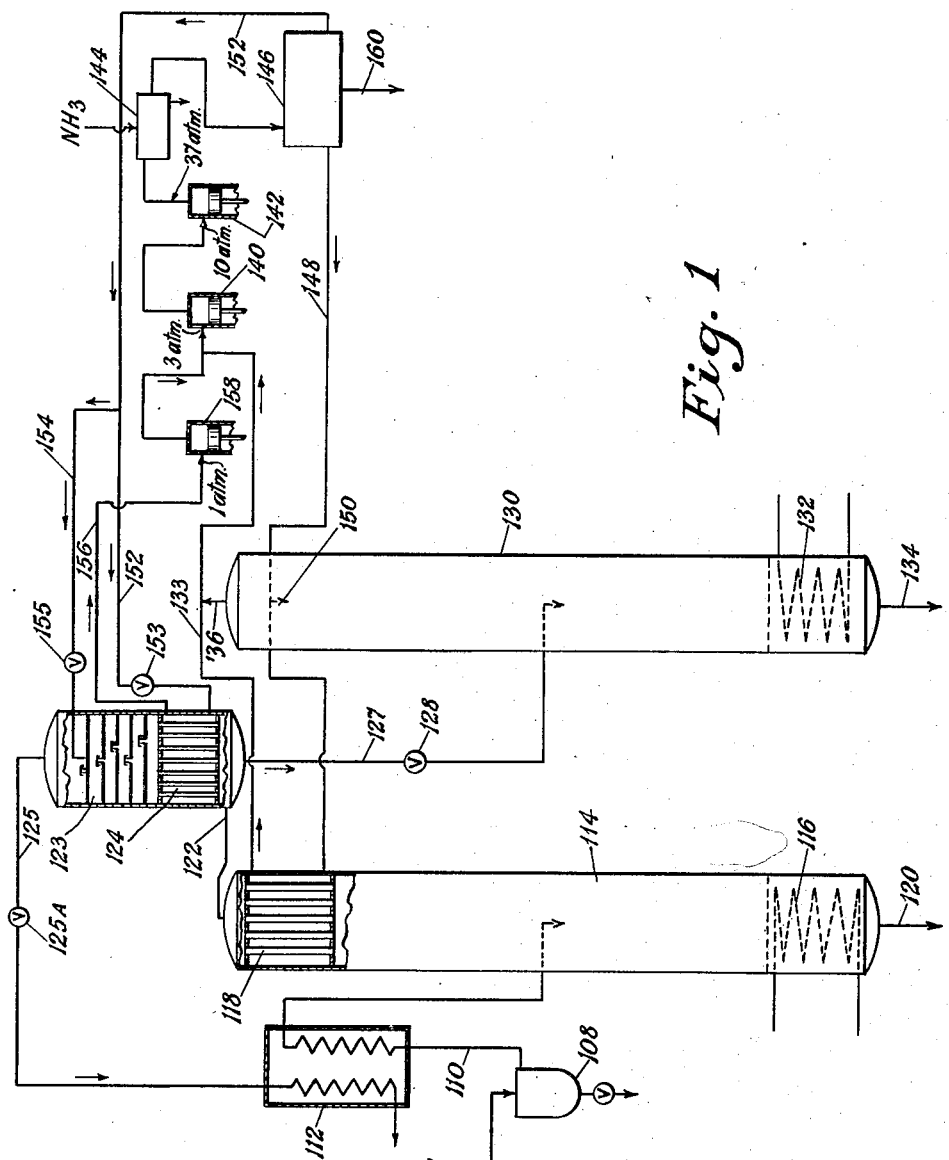
Figure 1 is a flow sheet of one modification of the process and apparatus for the purification of acetylene.

For the purpose of simplifying the terminology used herein and in the claims the components more volatile than acetylene will be termed the "heads" and the components less volatile than acetylene will be termed the "tails."

The following describes several embodiments of the applicants' invention as represented by the three figures shown in the drawings. It is to be understood that this description is merely illustrative and not intended to limit the invention in any way.

Referring to Figure 1 of the drawings, a crude gas generated by operating an electric arc submerged in oil and thoroughly dried by passing same over alumina gel was introduced into the system via conduit 102. The gas passed into multiple stage compressor 104 where its pressure was increased to about 11 atmospheres absolute. The crude gas was discharged from the compressor through conduit 106 and passed through cooler 107 into trap 108 where any condensed liquids contained therein were removed from the crude gas. This crude gas had the following composition:

| | Per cent | |
|---|---|---|
| Hydrogen | 52.7 | ⎫ |
| Methane | 6.0 | ⎬ heads |
| Ethylene | 6.0 | ⎭ |
| Acetylene | 28.0 | |
| Propylene | 1.2 | ⎫ |
| Methyl acetylene | 1.2 | ⎪ |
| Butylenes | 1.2 | ⎬ tails |
| Diacetylene | 2.5 | ⎪ |
| Other hydrocarbons | 1.2 | ⎭ |

The gas mixture leaving trap 108 via conduit 110 passed to heat exchanger 112, where it was cooled and then introduced into the rectifying column 114. Here the mixture was rectified by heating the fluid mixture in the calandria 116 at the bottom of the column to a temperature of about +15° C. and by cooling the condenser 118 at the top of the column to furnish reflux liquor to the column at a temperature of about −60° C. Under these conditions the mixture known as "tails" was withdrawn as a liquid through conduit 120 at the bottom of the column and the "heads" together with the acetylene were withdrawn as a gas from the top of the rectifying column through conduit 122. The gaseous fraction from conduit 122 passed into a backward return condenser 124 operated at substantially the same pressure as column 114. This condenser was cooled by expanding liquid ethylene from conduit 152 through expansion valve 153 into the condenser shell where it evaporated under a pressure of one atmosphere. The ethylene vapor produced by this evaporation passed through conduit 156 to the first stage of ethylene compressor 158 where it was compressed to 3 atmospheres and combined with the vapors issuing from 118 and 130. The evaporation of ethylene under one atmosphere pressure produced a temperature of −103° C. which was sufficient to cool the high pressure gas rising through the tubes of condenser 124 and entering rectifying section 123 to a temperature of −100° C. This high pressure gas was further cooled in rectifying section 123 by contacting it with liquid ethylene which was expanded into the top of rectifier 123 through conduit 154 and expansion valve 155. The evaporation of this ethylene produced a temperature of approximately −106° C. at the top of the rectifier. This liquid ethylene condensed acetylene and ethylene from the gaseous fraction. The lower boiling gases were expanded from the top of condenser 124 through valve 125A and by way of conduit 125 passed through heat exchanger 112 and hence out of the system. The acetylene and ethylene liquid mixture containing a small quantity of hydrogen and methane was removed from the base of condenser 124 by way of conduit 127. Pressure was reduced on the mixture by the expansion valve 128 to a pressure approximating three atmospheres absolute. The resulting fluid mixture was then introduced into rectifying column 130. Column 130 was operated by heating the fluid in calandria 132 at the bottom of the column at a temperature of approximately −60° C. and by introducing liquid ethylene at the top of the column via spray 150, which liquid ethylene boiled at a temperature of approximately −80° C. Under these conditions it was possible to maintain a liquid mixture of ethylene and acetylene throughout the column and separate substantially pure acetylene as a liquid at the bottom of the column by way of pipe 134. The ethylene containing approximately 1% of hydrogen and methane not removed by condenser 124 passed out of the column as a gas by way of conduit 136. From conduit 136 this gas passed into conduit 133 and thence to the second stage 140 of a three-stage compressor. This second stage compressed the ethylene from the intake pressure of 3 atmospheres absolute to an intermediate pressure of 10 atmospheres absolute and thence to a third stage 142, where the pressure was increased to 37 atmospheres absolute. From the third stage of the compressor the ethylene passed through the ammonia cooler 144 where it was liquefied and delivered to the ethylene receiver 146. Part of the liquefied ethylene was returned to the rectifying column 130 via conduit 148 and spray 150. Also via conduit 148 liquid ethylene was introduced into the condenser 118 of the rectifying column 114. Here the ethylene was permitted to evaporate at a pressure of about 3 atmospheres absolute in order to maintain the desired temperature conditions in the condenser. The ethylene vapors were returned from the condenser 118 via conduit 138 to the second stage 140 of the three stage compressor. Liquid ethylene from the receiver 146 was also introduced via conduit 152 into the shell of the backward return condenser 124. Here it was permitted to evaporate at a pressure of about one atmosphere absolute and the vapors evolved were conducted via conduit 156 through the first stage 158 of the three stage compressor. This liquid ethylene in the backward return condenser 124 boiled at a temperature of about −103° C. which was sufficient to lower the temperature of the vapors passing through the backward return condenser to about −100° C. Liquid ethylene from conduit 152 was also introduced via conduit 154 into the top of the condenser 124, as has previously been explained. This liquid ethylene lowers the temperature of the outcoming gas to nearly −106° C., the temperature at which the acetylene content of the vent gases approaches zero. The ethylene in turn is vaporized and passes out of the system via conduit 126 together with the lower boiling gases. In this manner a certain amount of ethylene is consequently lost for further recycle to the refrigeration system. Any liquid ethylene accumulating in the system in excess of the amount lost in condenser 124 may be withdrawn from receiver 146 via conduit 160 and thus recovered.

Due to the extreme difficulty in separating the last traces of acetylene from the ethylene vapor leaving the top of rectifier 130 or 224, this fraction ordinarily contains a small quantity of acetylene. The production of 99+% acetylene at the base of the rectifier is consistently attained.

In the above described process the liquid from the base condenser 124 is expanded directly into column 130 thru valve 128. The composition of this liquid is approximately 1% methane and hydrogen, 20% ethylene, and 79% acetylene. The presence of this 1% of hydrogen and methane is undesirable in operation as it collects in the ethylene refrigeration cycle as a difficultly condensible gas. This increases the discharge pressure on the ethylene compressor. The process may be modified, if it is desirable, so as to eliminate the presence of this 1% of hydrogen and methane. This may be accomplished by inserting immediately after the expansion valve 128 a gas and liquid separator and recycling back to the crude gas compressor 104 the vapors separated. In this way the liquid on expansion from 11 atmospheres absolute to 3 atmospheres absolute through valve 128 would be partially vaporized and this vapor would contain essentially all of the methane and hydrogen originally present in the 11 atmosphere liquid. The liquid separated in the gas and liquid separator would of course be conducted to the rectifying column 130 for processing as indicated above.

Figure 2:
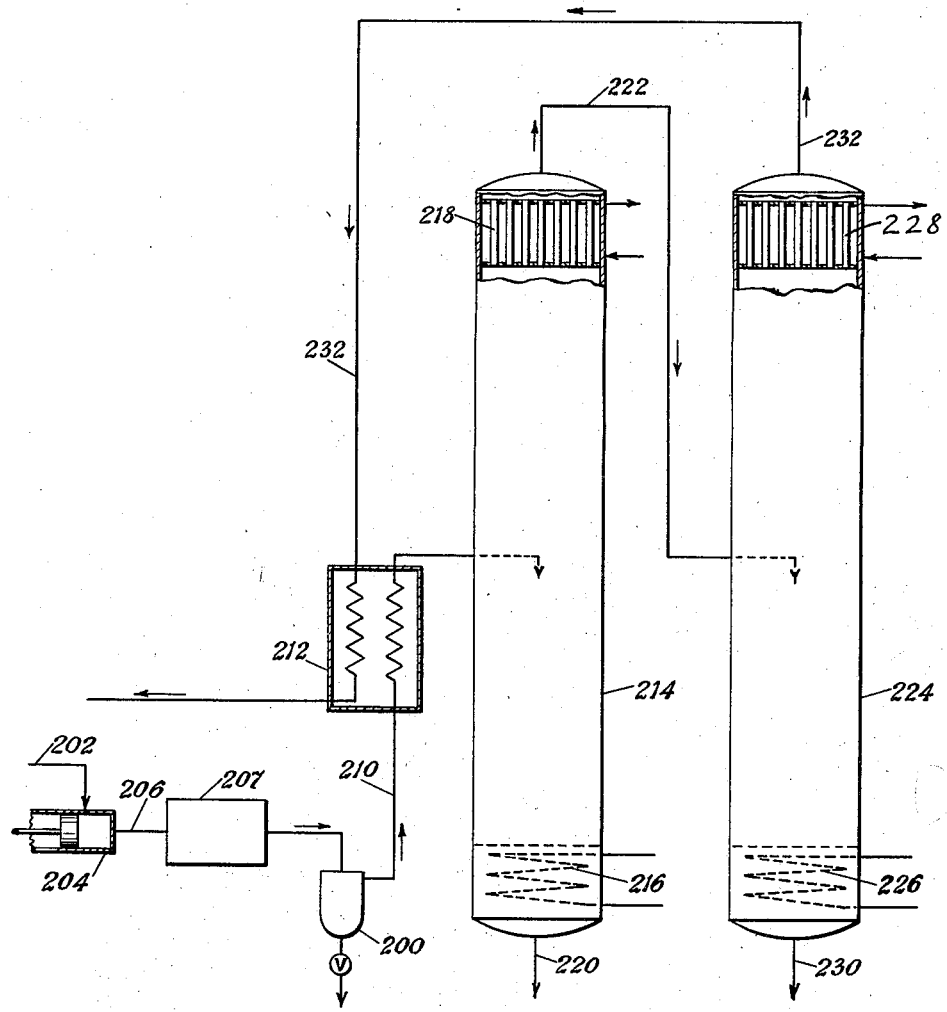
Figure 2 is a flow sheet showing another modification of the process and apparatus for the purification of acetylene in accordance with the process in which the components less volatile than acetylene are separated by liquefaction and acetylene is separated as a liquid in the second rectification step.

Another variation of this invention is shown by the process as illustrated in Figure 2. A dried crude gas was introduced into the system via conduit 202 and passed through compressor 204, conduit 206, cooler 207, trap 208, conduit 210, heat exchanger 212, and into the rectifying column 214 in a manner similar to that described for the like equipment shown in Figure 1. The rectifying column 214 was operated by heating the fluid in the calandria 216 to a temperature of about +15° C. and by cooling the condenser 218 to a temperature of about —60° C. Under these conditions the mixture known as "tails" was withdrawn as a liquid through conduit 220 at the bottom of the column and the "heads" together with the acetylene were withdrawn as a gas from the top of the rectifying column through conduit 222. This gaseous fraction was introduced into rectifying column 224 operating at approximately the same pressure as the first rectifying column. The liquid in the calandria 226 of the rectifying column 224 was heated at a temperature of approximately —28° C. and the condenser 228 at the top of rectifying column 224 was cooled to a temperature of approximately —100° C. so as to furnish reflux liquids in the column. Under these conditions pure acetylene was removed from the bottom of the column by way of conduit 230 and the lower boiling hydrocarbons and hydrogen were removed from the top of the column by way of conduit 232 from which they passed through cooler 212 and out of the system. This product acetylene was vaporized by heating it in heat exchange relationship with the crude gas leaving the main compressor or by expanding it through a second backward return condenser (not shown in the diagram) located below condenser 124. Precautions were taken so that the back pressure on the evaporating acetylene was always 1⅓ atmospheres or greater. In this manner substantially pure acetylene was obtained.

The refrigeration requirements in column 224 are much less complex than those discussed for the process shown in Figure 1. To obtain perfect separation of acetylene from the "heads" the temperature in the condenser 228 should be about —106° C. At this temperature acetylene loss will approach zero. Unfortunately if this temperature is produced using ethylene as the refrigerant a pressure of approximately one-half atmosphere absolute would be required. Should a mechanical failure allow air to leak into the ethylene, an explosion hazard would exist. Because of this potential hazard sub-atmospheric pressure refrigeration cycles are not desirable. If a methane refrigeration cycle were used, the desired temperature could be maintained with maximum safety but this extra cycle would add greatly to the complexity of equipment and cost of operation. For this reason it is preferred to allow a small loss of acetylene (approximately 5% of the total produced) by reducing the vent gas temperature to only about —100° C. and using as a refrigerant ethylene evaporating at atmospheric pressure. In the refrigeration process described in Figure 1, this loss is reduced by expanding ethylene directly into the gas stream at the top of condenser 124. Here its partial pressure is reduced to approximately one-half atmosphere absolute, thereby producing the desired temperature. The quantity of ethylene vaporized is limited to that which is carried off with the more volatile gases via conduit 136 and will be approximately equivalent to the ethylene content in the crude gas. Because the refrigeration so derived is limited, it will only cool the gas including condensation some 5° to 10° C. By this method the more volatile material, ethylene, is recycled and used to recover the less volatile material, acetylene.

Figure 3:
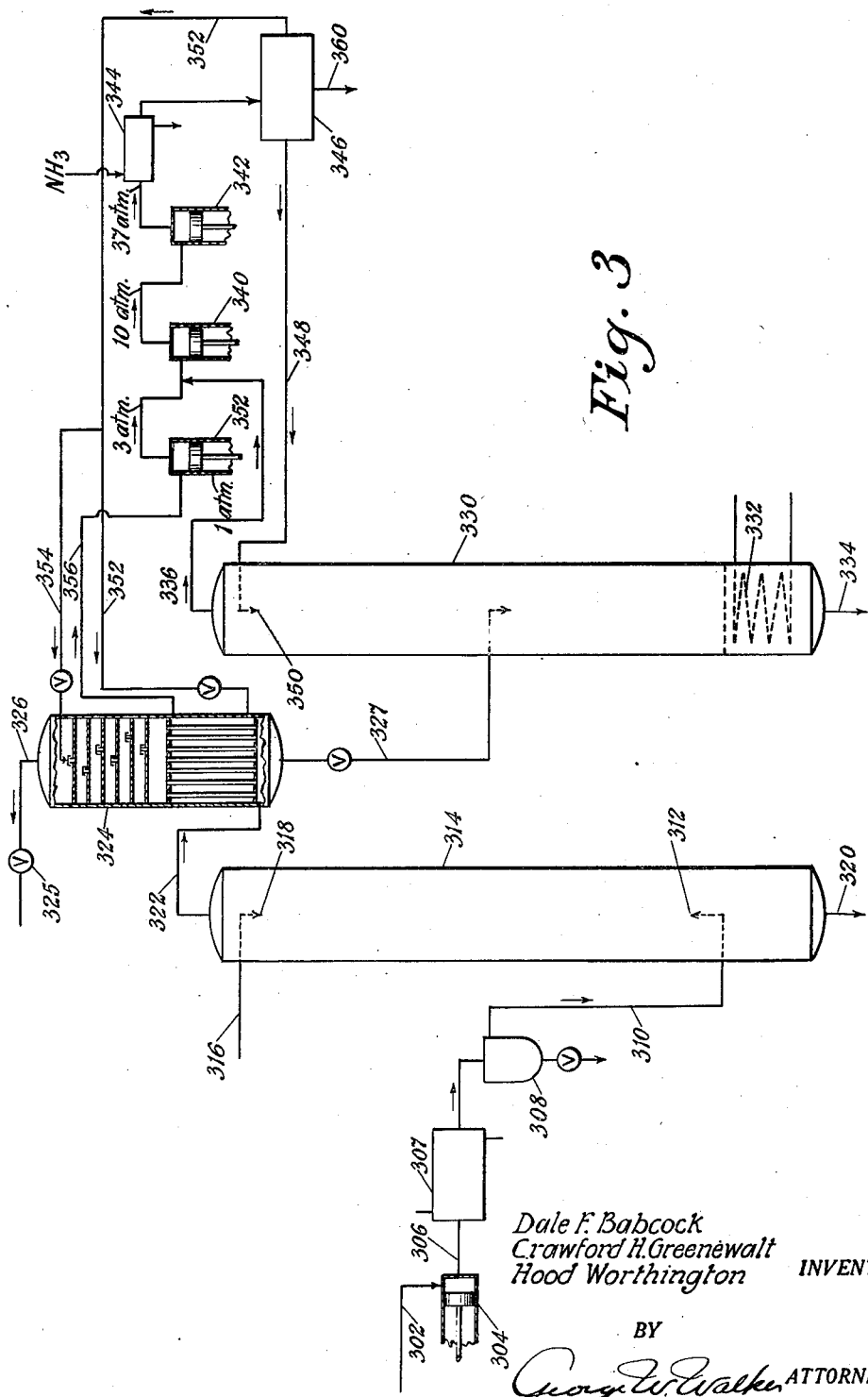
Figure 3 is a flow sheet of a process and apparatus of a third modification of this invention. This figure pertains to an apparatus similar in function to that shown in Figure 1 with the exception that the components less volatile than acetylene are removed by the scrubbing of the incoming gas with a non-selective solvent whereas in Figure 1 these components are removed by rectification.

Still another modification of the invention described herein is embodied in Figure 3. Here the crude gas, after previously being dried was introduced into the system via conduit 302 to compressor 304 where the pressure was increased to about 11 atmospheres absolute. The gas from the compressor 304 was conducted via conduit 306 through cooler 307 to trap 308, where any oil contained therein which had condensed was removed. The gas mixture was then passed from trap 308 via conduit 310 and outlet 312 into the bottom of the oil scrubber 314. Oil was admitted into the top of the oil scrubber via conduit 316 and spray 318. This oil is non-selective for the absorption of acetylene and therefore dissolved out the "tails" from the incoming gas. The "heads" together with the acetylene were conducted from the oil scrubber 314 via conduit 322. The oil containing the components known as "tails" was removed from the bottom of the scrubber 314 via conduit 320. This oil may be treated to remove the "tails" and recycled in the system or used as a fuel or disposed of in any other economical manner. The fraction containing the "heads" and acetylene as conducted from the gas scrubber 314 via conduit 322 was similar in composition to the fractions conducted from the rectifying column 114 via conduit 122, as shown in Figure 1, and as conducted from the rectifying column 214 via conduit 222, as shown in Figure 2. This gas in conduit 322 may be processed in accordance with the process disclosed for the equivalent gas in either Figures 1 or 2. Figure 3 is a diagram of the process when the gas is processed in accordance with the steps disclosed by Figure 1. As the operation of the backward return condenser 324 and 330 together with the ethylene compression system is fully disclosed in the description of Figure 1 and as this description likewise applies to Figure 3, the reference numerals being the same except for the hundred unit, the detailed description of the remainder of the process disclosed in Figure 3 will not be repeated herein.

As the drawings are purely diagrammatical, the equivalents of the various pieces of apparatus shown may be used; for example, the compressor 104 in Figure 1 is shown as a single stage compressor. It is not intended that the process and apparatus be so limited. The figure in the drawing merely represents the function of compressing the gases. When the incoming gases are at atmospheric pressure and the pressure must be increased to 11 atmospheres, a two or three-stage compressor would be required with water coolers between each stage. Similar type changes can be made in the other pieces of apparatus without departing from the spirit of the invention. Such changes are within the skill of those versed in the art.

In the present process it is essential that ethylene be present in the gases entering condenser 124 of Figure 1 and rectifier 224 of Figure 2. The presence of ethylene is necessary in order to avoid the freezing of acetylene. It is not essential that ethylene be added or that it be sprayed into the system as disclosed if the raw gas contains enough ethylene to prevent this freezing of acetylene. When the content of the raw gas contains sufficient ethylene any other suitable refrigerant may be substituted for the refrigerant supplied by the spraying of ethylene into the gas.

Liquid acetylene drawn off via conduits 134, Figure 1, 230—Figure 2, and 334—Figure 3, was stored or used as such. The liquid acetylene first passed into a suitable vaporizer where it was converted to a gas. From the vaporizer it was removed to suitable storage tanks.

In the description of the process as outlined above, it will be noted that the crude gas is dried prior to introducing same into the system. This drying may be accomplished by passing the gas over calcium carbide or the liquefaction of the water by cooling.

One of the essential features of the rectification process in which acetylene is separated as a substantially pure fraction is the presence in the rectifying column of sufficient ethylene to prevent the freezing of acetylene. It has been found that the progressively increasing ethylene concentration that is produced as the temperature in the rectifying column approaches −106° C. is almost automatically maintained by the reflux which is necessary for successful fractionation and it is also found that this plate-to-plate concentration is sufficiently high in each instance in ethylene to prevent freezing. If ethylene is not present in the incoming gas it may be added to the acetylene at any point in the system prior to the rectification of the acetylene-ethylene mixture. In order to avoid polymerization and possible explosion by heating the base of column 114 (Figure 1) and 214 (Figure 2) to a temperature required to free the liquid "tails" of acetylene, this liquid need only be concentrated to 75% "tails" and 25% acetylene. Such a concentration will require a temperature of from about 12° C. to about 20° C. The acetylene in the "tails," which amounts to nearly 5% of the total produced, can be recovered by expanding the liquid to atmospheric pressure, separating the flash gas from the liquid, and recycling this flash gas from the crude gas compressor 104 in Figure 1 and 204 in Figure 2.

The rectification process for the recovery of substantially pure acetylene may be varied in several ways; for instance, it is possible to first separate the hydrogen, methane and ethylene from the acetylene and less volatile components in a suitable rectification column and then to separate in a second column the acetylene from the less volatile components. Referring to Figure 2, this modification would operate as follows:

The gas from exchanger 212 would pass directly to column 224 without passing through the column 214. The heads from column 224 would contain hydrogen, methane and ethylene as in the original example. However, the liquid leaving conduit 230 will contain not only acetylene but also tails. This liquid (tails plus acetylene) would pass to tails column 214 from which liquid tails would be produced at the base leaving via conduit 220. Pure acetylene gas would be produced in the top of this column and would leave via conduit 222. The reflux required for this separation would be produced by heating calandria 216 and cooling condenser 218.

Another variation is to first separate hydrogen, methane, and a portion of the ethylene from the remainder of the ethylene, the acetylene, and the less volatile components in one rectification column and in a second rectification column completely remove the ethylene from the acetylene and the less volatile components, following this with a third rectification column in which the acetylene is separated from the less volatile components. Referring to Figure 1, this modification would operate as follows: the gas would pass from exchanger 112 directly into conduit 122. The liquid leaving condenser 124 via conduit 127 will now contain not only acetylene and ethylene but also tails. These tails appear at the base of column 130 and will be removed from the acetylene by passing the liquid from conduit 134 to column 114. The vapors evolved at the top of this column via conduit 122 will be essentially pure acetylene and the tails will be produced as a liquid, leaving the column via conduit 120.

In view of the fact that acetylene becomes more explosive with an increase in pressure, the process for the separation of acetylene as shown in Figures 1 and 3 is preferred to that shown in Figure 2. In Figures 1 and 3 it will be noted the acetylene is handled at a partial pressure of approximately 3 atmospheres absolute, whereas in Figure 2 the acetylene recovered by conduit 230 is at 10 atmospheres.

The first rectification column in the processes disclosed in Figures 1 and 3 may be operated at pressures between 4 atmospheres absolute and 18 atmospheres absolute. The temperature conditions used in the calandria and condenser of the column will of course vary with the pressure at which the column operates.

Liquefaction of gases and substantial separation of one or more components by fractional distillation is of course not new. Acetylene, however, presents a special problem in that it condenses first to a solid when cooled at atmospheric pressure and the solid melts at −81° C. in the range where liquefaction operations must be conducted. At atmospheric pressure the solid sublimes at −84° C. A great hazard is also involved when operating with acetylene gas under pressure due to its tendency to explode. The combination of hazard and solidification would indicate that acetylene cannot be separated by rectification under pressure at temperature below its freezing point, yet by the invention here described acetylene separated from other components by rectification at a temperature below its freezing point. This, therefore, marks a real advance in acetylene purification work.

It is preferred from the standpoint of safety to operate the rectifying column in which the acetylene is separated as a liquid from an acetylene-ethylene mixture—(see column 130 (Figure 1) and column 330 (Figure 3))—at a pressure between about 1 or 1⅓ atmospheres absolute and about 6 atmospheres absolute, but higher pressure may be used if desired. For example the rectification in the columns 130 (Figure 1) and 330 (Figure 3) is operative between 1.1 atmospheres and about 35 atmospheres, the lower pressure limit being fixed at the freezing of $C_2H_2$ at the temperature of operation. It is also possible to operate the condenser 124 (Figure 1) and 324 (Figure 3) at a lower pressure than rectifying columns 130 and 330. Practically, the pressure in each of the condensers 124 and 324 is higher in order to avoid the use of a pump or other means for conveying the fluid from 124 to 130 and from 324 to 330.

The cooling at the top of the rectifying column need not be produced by a direct spray of liquid ethylene although this is the preferred method. The cooling may be produced by one or more condensing means in at least one of which the cooling fluid is in heat exchange relationship with but out of contact with the gases being cooled.

It is apparent that many widely different embodiments of this invention may be made without departing from the spirit and scope thereof and therefore it is not intended to be limited except as indicated in the appended claims.

We claim:

1. A process for the separation of substantially pure acetylene from gases boiling above and below acetylene which comprises rectifying said gaseous mixture under a pressure between 5 and 18 atmospheres by heating the fluids in the base of the rectifying column to a temperature sufficient to eliminate substantially all of the acetylene and the lower boiling components and by cooling at the top of the rectifying column so as to condense substantially all of the components boiling higher than acetylene, subjecting the resulting gaseous fraction containing the acetylene and the lower boiling components to cooling at a temperature sufficient to condense the acetylene as a liquid while adding sufficient liquid ethylene as a spray to the fluid mixture to avoid separation of solid acetylene and to afford additional cooling of the gaseous fraction, hence producing a liquid mixture of ethylene and acetylene, reducing the pressure on this liquid mixture to between 1 and 6 atmospheres and rectifying the resulting fluid mixture, said rectification being carried out by spraying liquid ethylene directly into the top of the rectifying column and by heating liquid ethylene in the bottom of the column at a temperature which will separate the ethylene from the acetylene, thereby recovering substantially pure acetylene as a liquid from the base of the column.

2. A process for the separation of substantially pure acetylene from gases boiling below acetylene which comprises cooling the gaseous mixture in the presence of ethylene to a temperature sufficient to condense an ethylene-acetylene mixture, said ethylene being present in an amount sufficient to prevent the separation of solid acetylene, rectifying the resulting liquid mixture at a pressure between 1 and 6 atmospheres, said rectification being carried out by spraying liquid ethylene directly into the top of the rectifying column and by heating the liquid acetylene at the bottom of the column to a temperature that will separate the ethylene from the acetylene, thereby recovering substantially pure acetylene as a liquid from the base of the column.

DALE F. BABCOCK.
CRAWFORD H. GREENEWALT.
HOOD WORTHINGTON.